(No Model.)
C. B. MACY.
PAPER SLITTER.
No. 507,074. Patented Oct. 17, 1893.
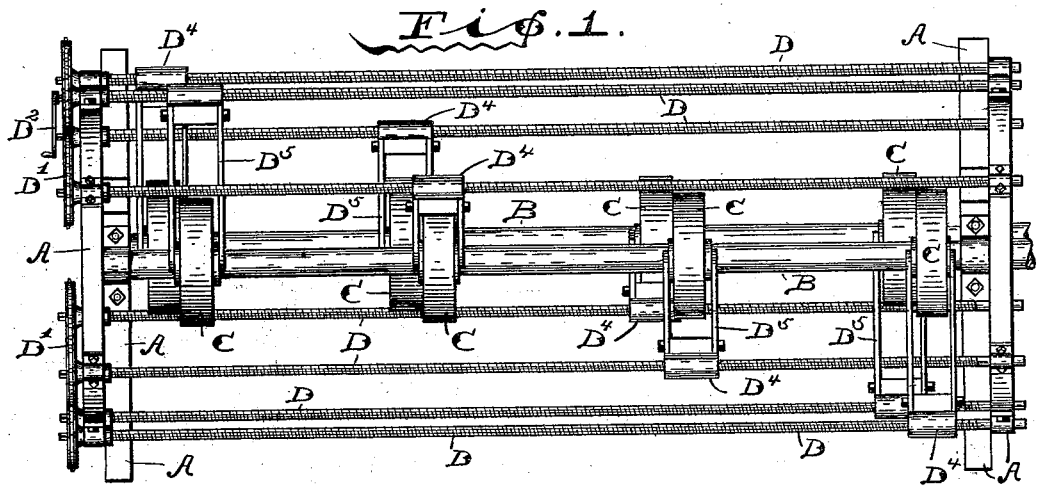
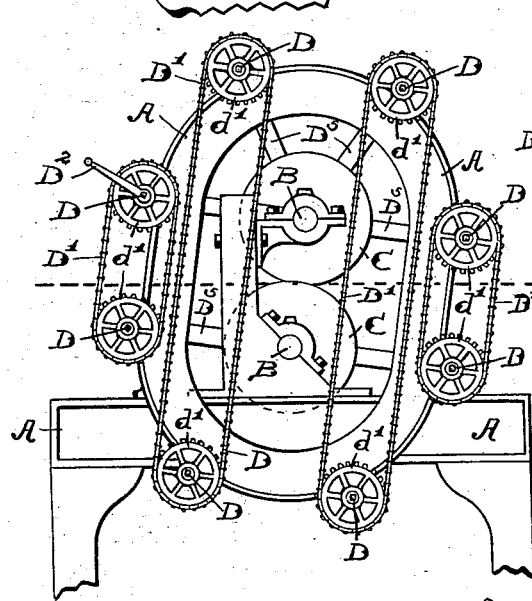
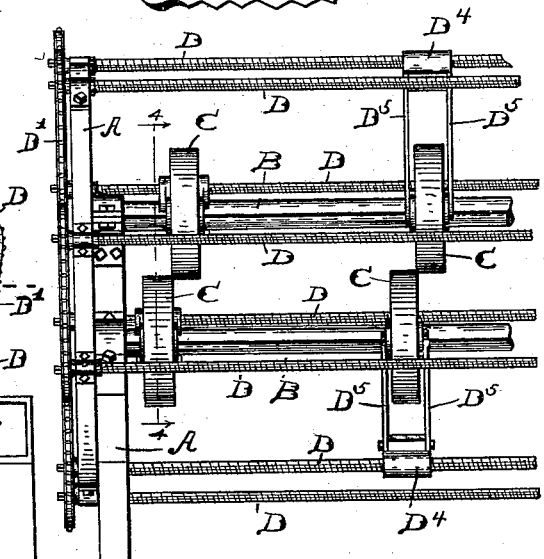
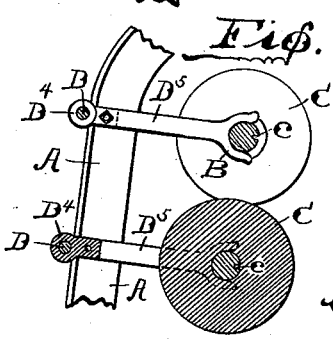
WITNESSES:
F. W. Warner
J. A. Walsh
INVENTOR
Charles B. Macy,
BY Chester Bradford,
ATTORNEY.

UNITED STATES PATENT OFFICE.

CHARLES B. MACY, OF NOBLESVILLE, INDIANA.

PAPER-SLITTER.

SPECIFICATION forming part of Letters Patent No. 507,074, dated October 17, 1893.

Application filed June 5, 1893. Serial No. 476,593. (No model.)

*To all whom it may concern:*

Be it known that I, CHARLES B. MACY, a citizen of the United States, residing at Noblesville, in the county of Hamilton and State of Indiana, have invented certain new and useful Improvements in Paper-Slitters, of which the following is a specification.

The object of my said invention is to provide a means, in that class of machines whereby paper in being manufactured is slit into commercial widths, whereby the slitter may be adjusted without stopping the operation of the machine, or breaking the paper which is passing through it. A machine embodying said invention will be first fully described, and the novel features thereof then pointed out in the claim.

Referring to the accompanying drawings, which are made a part hereof, and on which similar letters of reference indicate similar parts, Figure 1 is a top or plan view of a machine embodying my said invention; Fig. 2 an end elevation of the same; Fig. 3 a fragmentary side elevation, and Fig. 4 a detail sectional view on the dotted line 4 4 in Fig. 3.

In said drawings the portions marked A represent the frame-work of the machine; B the shafts carrying the slitting wheels; C said slitting wheels, and D screw rods by which and through suitable arms the adjustment may be effected.

The machine in its general construction is not dissimilar from other machines for the purpose, my present invention relating especially to the means for adjustment.

The shafts B are mounted in suitable bearings in the frame-work A, and carry the slitters C, which are wheels having sharp edges running close to each other. The shafts are provided with grooves or key ways, and splines or feathers $c$ on the slitting wheels enter said grooves and prevent the wheels from revolving on the shafts, while permitting a free longitudinal adjustment thereof.

The screw rods D are mounted in pairs in any suitable or desirable manner upon the frame A, and are connected by chain or other belts D' which run over the sprocket wheels $d'$ thereon. Each pair is thus adapted to be simultaneously operated, and an ordinary crank $D^2$ is the usual means of operation, as will be readily understood. This crank may be moved from one to another, as one or the other of the sets of slitting wheels is to be adjusted. Mounted upon these screw rods are nuts $D^4$, which, the screw rods themselves being mounted in bearings on the frame-work, are adapted to be driven back and forth as the screw rods are revolved. Upon these nuts are arms $D^5$ which extend out and engage with the hubs of the slitting wheels, and thus, as the screw rods are revolved, and the nuts driven back and forth the slitting wheels are also driven back and forth, and thereby adjusted. These arms are so positioned as not to cross the path of the paper, (which is represented by a heavy dotted line in Fig. 2,) and thus the adjustment can be effected without in any way interfering with the paper or stopping the operation of the machine.

Having thus fully described my said invention, what I claim as new, and desire to secure by Letters Patent, is—

The combination, in a paper slitting machine, of the slitting-wheel shafts mounted in bearings in the frame-work, the slitting wheels mounted on said shafts, screw rods also mounted in bearings in said frame-work in pairs, belts connecting the screw rods of each pair, nuts on said screw rods, and arms extending therefrom to said slitting wheels, whereby the slitting wheels of each pair may be simultaneously operated, substantially as set forth.

In witness whereof I have hereunto set my hand and seal, at Indianapolis, Indiana, this 1st day of June, A. D. 1893.

CHARLES B. MACY. [L. S.]

Witnesses:
FRANK W. WARNER,
JAMES A. WALSH.